Sept. 5, 1944.　　C. H. HARRIS ET AL　　2,357,327
FOCUSING OBJECTIVE MOUNT
Filed Oct. 3, 1941
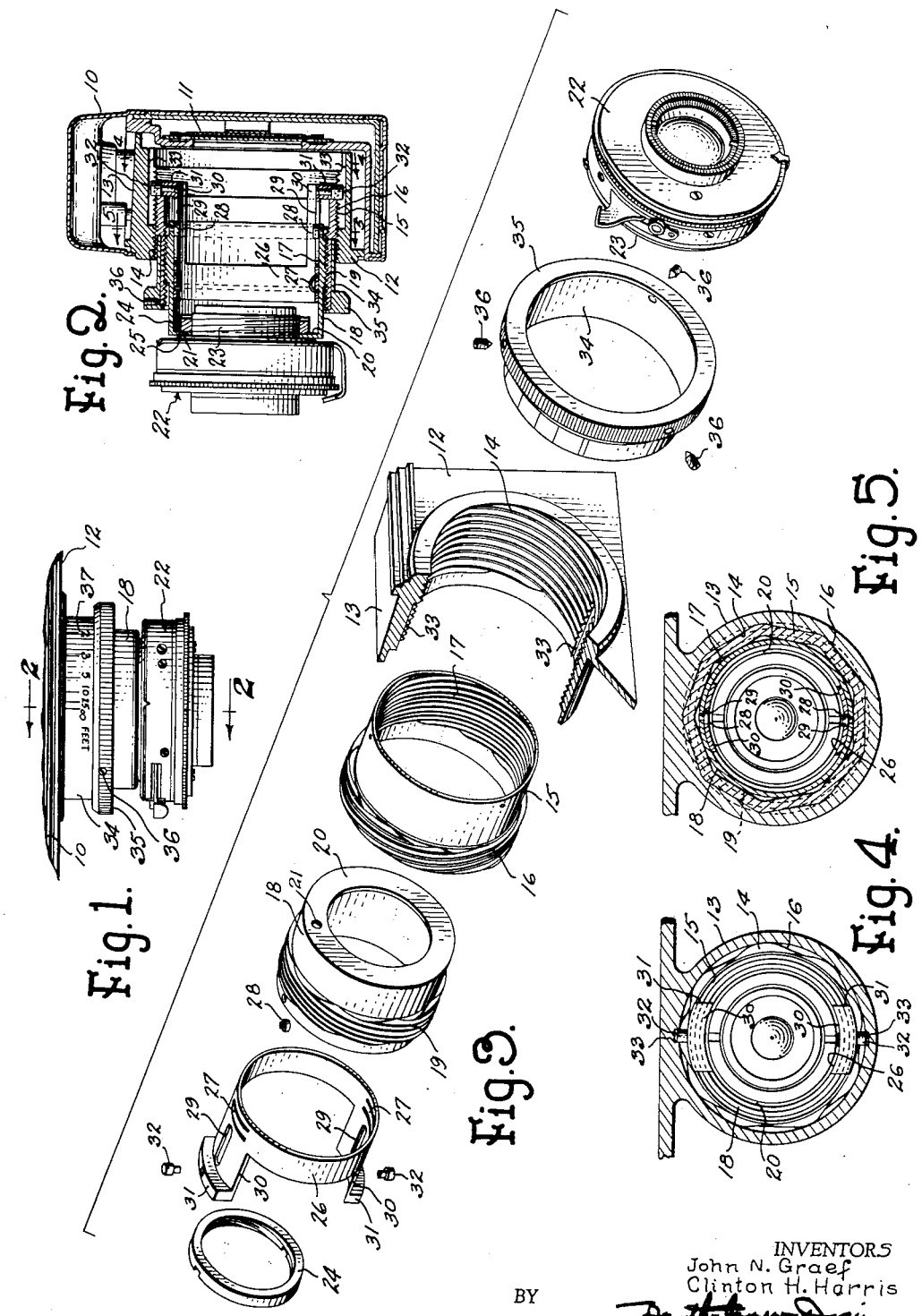
INVENTORS
John N. Graef
Clinton H. Harris
BY
Attorney Patented Sept. 5, 1944

2,357,327

UNITED STATES PATENT OFFICE 2,357,327

FOCUSING OBJECTIVE MOUNT

Clinton H. Harris and John N. Graef, Ann Arbor, Mich., assignors to Argus, Incorporated, a corporation of Michigan Application October 3, 1941, Serial No. 413,516

11 Claims. (Cl. 95—45)

This invention relates to focusing mounts for photographic objectives and more particularly to objective focusing mounts for use on cameras. One of the objects of the present invention is to provide a focusing objective mount which is simple and effective in operation yet rugged and inexpensive in construction. Another object is to provide a threaded focusing mount having a smooth and uniform focusing movement throughout its range. A further object is to provide a focusing mount for photographic objectives which will maintain an objective in set position. A still further object is to provide an objective focusing mount in which a long range of movement is obtained while the mount is kept relatively small and compact. These and other objects and advantages reside in certain novel features of construction arrangement and combination of parts as will hereinafter be more fully set forth and pointed out in the appended claims.

In the drawing:

Fig. 1 is a top plan view of an objective mount embodying our invention.

Fig. 2 is a vertical section taken on line 2—2 of Fig. 1.

Fig. 3 is an exploded view of said lens mount.

Fig. 4 is a section taken on line 4—4 of Fig. 2.

Fig. 5 is a section taken on line 5—5 of Fig. 2.

A preferred form of our invention is illustrated in the drawing wherein 10 designates the body of a camera having film supporting mechanism indicated generally at 11. The structural details of the camera form no part of the present invention, but one suitable camera is described and claimed in U. S. patent application Serial No. 413,518, filed October 3, 1941, by Clinton H. Harris and entitled "Photographic camera." The camera is provided with a front plate 12 which has an inwardly extending sleeve portion 13 threaded as indicated at 14. A sleeve 15 formed with external threads 16 complemental to the threads 14 of the sleeve 13 is threaded into the sleeve portion 13. This sleeve 15 also has internal threads 17. The threads 16 and 17 are preferably of opposite hand, but may be of the same hand provided they are of different pitch. In order to give a sufficient focusing movement with a reasonable rotation of the sleeve 15, it is also preferable that the threads 16 and 17 be multiple threads. A third sleeve 18 has external threads 19 for engaging the threaded portion 17 of the sleeve 15. This sleeve 18 has at its forward end an inwardly extending flange 20. The usual lens and shutter assembly indicated generally at 22 has a rearwardly extending threaded portion 23 which projects through the opening in the flange 20 and is secured to the flange 20 and sleeve 18 by a lock nut 24. A pin 25 shown in Fig. 2 extends into an aperture 21 of the flange 20 and serves to position the lens and shutter assembly 22 relative to the sleeve 18.

A key member 26 within the smooth bore of the sleeve 18 is formed with tongues 27 which bear frictionally against this inner bore. The key 26 is free to slide longitudinally within the sleeve 18 but is held against rotation by the inwardly extending pins or studs 28 which are fixed in the sleeve 18 and extend into longitudinal slots 29 in the key member 26. These slots 29 are formed in a pair of fingers 30 which extend rearwardly from the key member 26 and terminate in outward flanges 31.

A pair of pins or studs 32 are fastened to and extend outwardly from the flanges 31 into a pair of longitudinal grooves 33 formed in the threaded portion 14 of the sleeve 13. Thus, it can be seen that the sleeve 18 is held by means of the key 26 against rotation relative to the sleeve 13 so that rotation of the intermediate sleeve 15 will cause an axial movement of the lens and shutter assembly 22. The flanges 31 serve to limit the extent of this focusing mechanism by abutting the sleeve 18 in one direction of movement and the film holding mechanism 11 in the other direction of movement. The use of a traveling key, that is, a key which has a sliding connection to both the sleeve 18 and the sleeve 13 permits an unusually long movement while the overall depth of the mount is not unduly increased.

A collar 34 provided with a knurled ring 35 is secured to the sleeve 15 by a plurality of set screws 36. This collar forms a convenient means for rotating the focusing sleeve 15 and it is preferably graduated as indicated at 37 in Fig. 1. The key 26 is preferably formed of a springy material and the fingers 30 bear lightly outward to press the pins 32 into the grooves 33. The tongues 27 also bear frictionally against the inner wall of the sleeve 18, thus affording a smooth frictional focusing movement and securely holding the lens against accidental movement after it has been brought into proper position.

From the foregoing, it will be apparent that we are able to attain the objects of our invention and provide a simple and inexpensive focusing objective mount which has a smooth and uniform movement throughout its range and in which the lens is held against accidental displacement. While we have illustrated our invention as applied to a particular type of camera, it is apparent that it may be applied to cameras of many different types, or may be applied to a focusing lens mount separate from a camera.

Having thus described our invention, what we claim as new, and desire to secure by Letters Patent, is:

1. In a focusing mount for objectives in combination, a support, an inner sleeve axially slidably mounted in said support, an objective lens carried by said sleeve, an intermediate sleeve threadedly connecting said support and said inner sleeve, a key member axially slidable in said inner sleeve and said support, means for preventing rotary movement between said support and said key member and means for preventing rotary movement between said inner sleeve and said key member.

2. A focusing mount for objectives comprising a support having an internally threaded bore, an annular sleeve threaded in said bore, the interior of said annular sleeve being also threaded, an inner sleeve threaded in the interior of said annular sleeve, an objective carried by said inner sleeve, a traveling key member frictionally engaging the interior of said inner sleeve, means for preventing relative rotation between said inner sleeve and said key member, a pair of diametrically opposite projections extending rearwardly from said key member and interengaging means on said projections and on said support for preventing relative rotation between said projections and said support.

3. A focusing mount for objectives comprising an outer fixed sleeve, an intermediate sleeve threadedly connected thereto, an inner sleeve threadedly connected to said intermediate sleeve, means for mounting an objective on said inner sleeve, an axially slidable key member, means for slidably connecting said key member to said inner sleeve and means for slidably connecting said key member to said fixed sleeve.

4. A focusing objective mount comprising a fixed sleeve, a focusing sleeve threadedly mounted within said fixed sleeve, a lens sleeve threadedly mounted within said focusing sleeve, means for mounting an objective on said lens sleeve, a traveling key axially slidably mounted within said lens sleeve, cooperating means on said lens sleeve and traveling key forming a longitudinally sliding connection between said key and lens sleeve, cooperating means on said fixed sleeve and said key forming a longitudinally sliding connection between said key and said fixed sleeve, and frictional holding means between said key and said lens sleeve.

5. A focusing objective mount for cameras comprising a support, an objective mount longitudinally movable within said support, right and left hand threads on the mount and support, an adjusting sleeve connecting the mount and support and having right and left hand threads engaging the threads on the mount and support, an axially slidable annular ring within said mount in frictional engagement with the wall of said mount, longitudinal guide means on said ring, means on said mount operatively engaging said guide means, and means operatively connecting said support and said ring for preventing rotation of said ring.

6. In a camera, a fixed internally threaded sleeve, a rotatable intermediate focusing sleeve threaded externally for mounting in said fixed sleeve, an internally threaded portion on said rotatable sleeve, a third sleeve externally threaded for mounting within said rotatable sleeve, means for mounting a lens assembly on said third sleeve, and axially travelling means enclosed by said sleeves operably interconnecting said fixed sleeve and said lens sleeve for holding said lens sleeve against rotation so that said lens sleeve has only axial sliding movement when said focusing sleeve is rotated, said axially traveling means comprising a frictionally mounted key slidable axially of said sleeves and having parallel pin and slot connections with said fixed sleeve and said lens sleeve.

7. In a camera, a fixed support, a rotatable focusing member on said support, a lens tube threadedly mounted within said sleeve, an axially displaceable key member frictionally mounted on said tube, a pin and groove connection between said key member and said lens tube permitting relative axial displacement thereof but holding said key member and lens tube against relative rotation, and a second pin and groove connection between said key member and said fixed support permitting relative axial displacement but holding the key member against rotation, said grooves being substantially parallel to the lens axis so that rotation of said focusing member produces only axial displacement of said lens tube.

8. In a camera having a body providing a forwardly facing recess, an objective mount cooperating with said recess, comprising a lens sleeve; means mounting said lens sleeve for axial movement from a collapsed inoperative position with respect to said recess to an extended operative position with respect to said recess, and also being axially movable from the latter position outwardly to a near focus position; and means cooperating with said camera body and said lens sleeve for restraining said lens sleeve against rotation while permitting free axial movement thereof, comprising a guiding device having keying engagement with both said camera body and said lens sleeve and operable to undergo a total axial movement with respect to said body and sleeve which is materially less than the total axial travel of said lens sleeve from said collapsed position to said near focus position.

9. The camera construction defined in claim 8, wherein said means for mounting said lens sleeve comprises an intermediate sleeve disposed between and threadedly connected to said lens sleeve and the wall of said recess, and the rear end of said intermediate sleeve is operable to contact a portion of said guiding device and limit travel of the latter in one direction of movement of said lens sleeve.

10. The camera construction defined in claim 8, wherein said camera body is provided with a forwardly facing wall adjacent the bottom of said recess operable to contact a portion of said keying device and limit rearward travel of said keying device in response to movement of said lens sleeve toward collapsed position.

11. The camera construction defined in claim 8, wherein said means for mounting said lens sleeve comprises an intermediate sleeve disposed between and threadedly connected to said lens sleeve and the wall of said recess, and said guiding device comprises a guide member axially slidable in said lens sleeve and having a plurality of keys projecting outwardly beyond said intermediate sleeve and seating in parallel keyways provided in said wall of said recess, said guide member having a plurality of keyways paralleling the keyways of said recess and cooperating with a plurality of keys provided on the interior of said lens sleeve.

CLINTON H. HARRIS.
J. N. GRAEF.